United States Patent [19]
Tucker

[11] 3,715,601
[45] Feb. 6, 1973

[54] APPARATUS FOR DETECTING IRREGULARITIES IN THE LIGHT TRANSMISSION PROPERTIES OF MATERIALS

[75] Inventor: James Henry Tucker, Cambridge, England

[73] Assignee: National Research Development Corporation, London, England

[22] Filed: July 8, 1970

[21] Appl. No.: 53,139

[30] Foreign Application Priority Data

July 14, 1969 Great Britain...................35,335/69

[52] U.S. Cl............250/222 R, 250/217 CR, 356/39
[51] Int. Cl...................................................G01n 5/02
[58] Field of Search........250/219 DF, 206, 214, 209, 250/210, 222 PC, 222 R, 83.3 UV, 217 CR; 356/237, 239, 36–41, 51

[56] References Cited

UNITED STATES PATENTS

| | | |
|---|---|---|
| 3,327,117 | 6/1967 | Kamentsky...................250/83.3 UV |
| 3,387,173 | 6/1968 | Hall..........................250/217 CR X |
| 3,463,592 | 8/1969 | Akerman..............................356/95 |
| 3,497,690 | 2/1970 | Wheeless, Jr. et al. ...250/83.3 UV X |
| 3,451,756 | 6/1969 | Young.....................250/219 DF X |
| 3,056,032 | 9/1962 | Cannon....................250/219 DF X |
| 3,257,563 | 6/1966 | Laurent.........................250/219 DF |
| 3,493,769 | 2/1970 | Revesz et al.........................250/214 |

*Primary Examiner*—Walter Stolwein
*Attorney*—Cushman, Darby & Cushman

[57] ABSTRACT

An apparatus and a method are described for detecting areas of a material which differ in opacity or reflectivity from surrounding areas, and particularly for detecting cell nuclei in stained biological preparations. The material is scanned line by line and the output is applied to a comparator which receives a threshold signal dependent on the opacity or reflectivity of the neighborhood of the area being scanned. The threshold signal is derived by summing the scanner output signal for that part of the line immediately preceding the point being scanned and corresponding parts of adjacent previously scanned lines. Means are provided for holding the threshold signal steady when a cell nucleus is being scanned.

8 Claims, 2 Drawing Figures

APPARATUS FOR DETECTING IRREGULARITIES IN THE LIGHT TRANSMISSION PROPERTIES OF MATERIALS

The present invention relates to apparatus for detecting differences in the opacity of a material or the reflectivity of its surface. The apparatus is particularly, but not exclusively, useful in detecting cell nuclei in stained biological cell preparations, and may also be used determining the extent of such nuclei.

In detecting cell nuclei one problem occurs because while the opacity of any one nucleus is usually appreciably higher than that of its immediate surroundings it is not necessarily higher than that of the stained material in other areas or than all nonnuclear objects in the whole field considered. The nucleus is almost always bounded by a region of relatively high optical gradient.

According to the present invention there is provided apparatus for detecting the presence of areas of a material having light transmission properties which differ from those of the remainder of the material, including scanning means for generating a signal dependent on the intensity of light received from different portions of the material, threshold-determining means for forming a threshold signal of value dependent on the light transmission properties of the material in the neighborhood of the portion from which light is received by the scanning means at any time during operation, and comparator means for comparing the light intensity signal with the threshold signal and providing a binary output signal having one value when the value of the light intensity signal exceeds that of the threshold signal and another value when the value of the light intensity signal is below that of the threshold signal.

The term light transmission in this specification includes transmission by reflection from the surface of the material in addition to transmission through the material.

Such apparatus is able in most cases to overcome the problem mentioned above, since the threshold signal depends not on a fixed or manually variable quantity but on an automatically adjusted quantity determined by the signal received from an area near the portion being scanned. If a nucleus is being scanned the said area will usually be less opaque than the nucleus.

According to a second aspect of the present invention there is provided a method of detecting the presence of areas of a material having light-transmission properties which differ from those of the remainder of the material including scanning the material to generate a signal dependent on the intensity of light received from different portions of the material, forming a threshold signal of value dependent on the light transmission properties of the material in the neighborhood of the portion being scanned at any time, and comparing the light intensity and threshold signals to provide an output signal having a first predetermined value when the value of the light intensity signal exceeds that of the threshold signal and having a second predetermined value when the value of the light intensity signal is smaller than that of the threshold signal.

An embodiment of the invention will now be described, by way of example, with reference to the accompanying drawings, in which.

Figure 1:
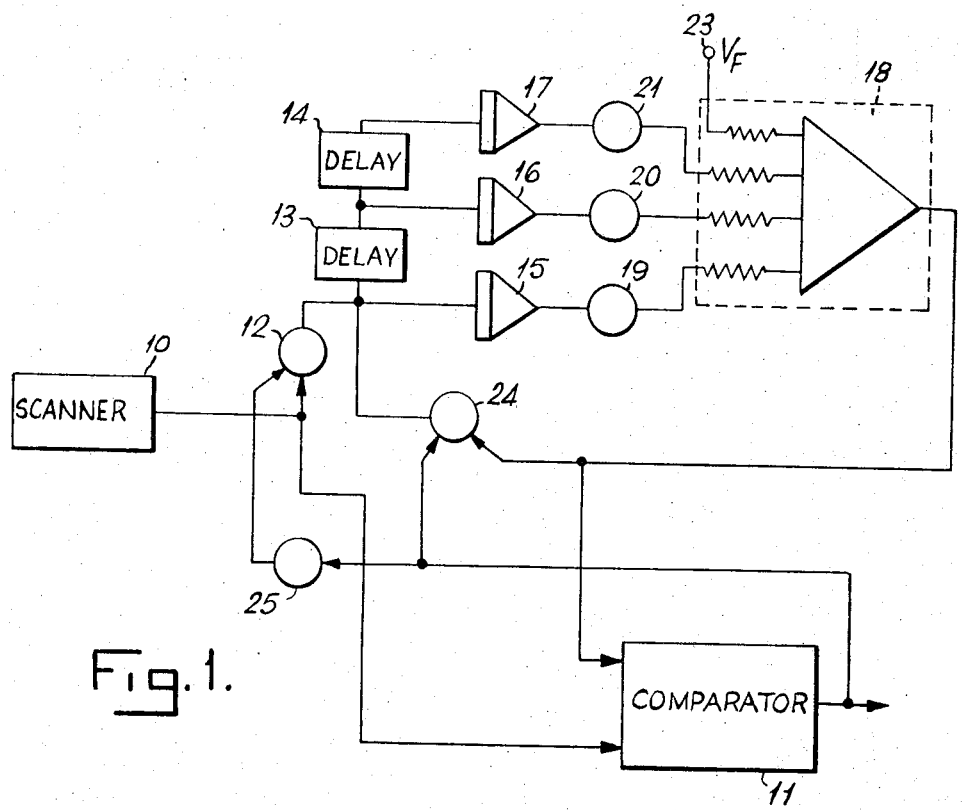
FIG. 1 is a block diagram of apparatus according to the invention.

In FIG. 1 a flying spot scanner 10 of known type is used to scan a microscope slide (not shown) carrying a stained slice of biological material and to provide an electrical signal of instantaneous magnitude dependent on the opacity of small areas or elements of the slide. The scanner includes a cathode ray tube opposite the slide, and a lens system and a light sensitive device to receive light by way of the slide from a light spot scanning the tube face. The signal from the scanner 10 is passed to a comparator 11 where its magnitude is compared with a threshold signal dependent on the opacities of elements already scanned.

The scanner 10 is connected by way of gate 12 to a series of delay lines, and integrators each of which provides a continuous signal of magnitude substantially proportional to the integral of its input signals over a predetermined interval immediately preceding the instant considered. In the FIG. 1 there are two delay lines 13 and 14 each having a delay equal to the time required to scan one line, and three integrators 15, 16 and 17. The delay lines may for example be quartz glass delay lines; that is piezo electric devices with pressure/electric transducers at each end. The integrators each simply comprise a series resistor and a shunt capacitor and an approximate integration is carried out; instead each integrator may be a series of $\pi$ filter sections or may itself comprise a group of short delays of duration equal to one scan element connected in series, with a summing amplifier connected to sum the outputs of these delay lines. The output signals from the integrators 15, 16 and 17 are taken to a summing amplifier 18 but since this amplifier inverts and the integrators are in this example resistance-capacitance networks, the integrators are connected by way of inverters 19, 20 and 21 to provide a signal having the same polarity as the scanner output signal. A fixed bias voltage is also applied to the summing amplifier 18 from a terminal 23. The output signal from the summing amplifier is applied as the threshold signal for the comparator 11, and is also passed, when required, under the control of a gate 24 back to the delay lines 13 and 14 and the integrators 15, 16 and 17.

The comparator 11 provides a binary output signal having the value 'one' if the threshold is exceeded, or 'zero' if not, and this signal is passed to a computer (not shown) and in addition to control the gates 12 and 24. Hence the output of the comparator is coupled to the gate 24 and by way of an inverter 25 to the gate 12 and these gates form logic means controlling the input signals to the integrator 13 and the delay lines 13 and 14.

Figure 2:
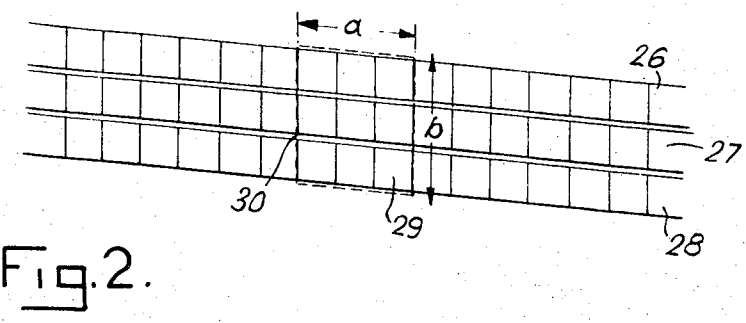
FIG. 2 illustrates how stained material is notionally divided when scanned by the apparatus of FIG. 1.

In operation, the scanner 10 scans the slide line by line in a television type raster. Thus part of the slide can be shown as in FIG. 2 where three scan-lines 26, 27 and 28 are divided into elements such as the element 29.

If this element is being scanned and the gate 12 is open, the output signal from the integrator 15 depends on the integral of the opacities of $a$ elements including the element 29 as the last element. Since the signals reaching the integrators 16 and 17 are delayed by the durations of one and two lines respectively, the output signals of these integrators will depend on the opacities of the groups of elements in the lines 27 and 26 corresponding to the elements a in the line 28.

In resistance-capacitance integrators of the type mentioned, the effect at any time of the opacity of the first of the a elements in a group on the output signal will be small, and hence an arbitrary boundary between this element and the preceding one whose effect is even smaller is chosen. With other types of known integrators the boundary is clearly delineated.

Thus the output signal of the amplifier 18 will depend on the sum of the opacities of a corresponding elements in the lines 26, 27 and 28 and therefore on the average opacity of an area 30 and on a constant value K set by the bias voltage applied at the terminal 23. The magnitude T of the threshold signal may therefore be expressed as:

$$T = K_1 + K_2 \sum_{\alpha \in (y-b)}^{y} \sum_{\beta \in (x-a)}^{x} (V_{\alpha,\beta})$$

where $K_2$ is a constant of proportionality,
$x,y$ are the co-ordinates of the element at present scanned, i.e. the element 29,
$b$ is the number of integrators, i.e. three in this example,
$V$ is the output voltage of the scanner 10 due to the element at present scanned, and
$\epsilon$ denotes "in the set of".

Each element is typically about 1 micron in height and width and $a$ and $b$ both equal four or eight elements.

If therefore the instantaneous magnitude of the signal from the comparator 11 is greater than a constant times the sum of the signals from the integrators 15, 16 and 17 by an amount dependent on the voltage applied at the terminal 23, the comparator provides a binary one. The voltage at the terminal 23 is so set that such an output usually occurs when the scan crosses the boundary between a nucleus and the surrounding material. The neighborhood region dimensions and the threshold calculating function are selected to provide the optimum detection of cell nuclei consistent with adequate rejection of non-nuclear areas. The apparatus is insensitive to reasonable non-uniformities in sensitivity of the scanner 11 over the scanned areas, and also to local and larger variations in illumination of the image. The threshold value is low where the opacity of the neighborhood area is high but high where opacity is low.

In order that the threshold value does not change as a nucleus is scanned, the binary one from the comparator 11 is arranged to close the gate 12 by way of the inverter 25 and to open the gate 24 allowing a constant threshold signal to be fed back from the amplifier 18.

The binary ones and zeros from the comparator 11 are passed together with scan timing information to a computer (not shown) which provides information about the area and numbers of nuclei, and also about the numbers of nuclei having areas larger than one or more limits. The way in which these calculations are made do not form part of the present invention and will be clear to those familiar with computers and computer programming. For this reason the processing of the output of the apparatus of FIG. 1 will only be described briefly. The computer stores the co-ordinates of the beginning and end of each group of elements in a line for which the threshold is exceeded, and compares the co-ordinates so found with similar co-ordinates for other lines. Where such co-ordinates correspond, the elements belong to the same nucleus, and in this way the area of each nucleus and the number of nuclei are found.

Where the optical density of a nucleus is important the comparator may be replaced by a subtractor, the binary one for the gates 12 and 24 being generated when the output of the subtractor is greater than a predetermined value. The subtractor may then be coupled to an analogue-to-digital converter which is coupled to the computer, and the computer may also receive the binary signal as a means of calculating further information.

Although a specific embodiment of the invention has been described it will be clear that the invention may be put into practice in many other ways. For example the scanner 10 may be replaced by a television camera or a photo-multiplier and in such arrangements the slide or other object being studied may be scanned by movement thereof in mutually orthogonal directions. The block diagram of the apparatus may not be as shown in FIG. 1, and FIG. 1 itself may be modified; for example by the omission of the gates 12 and 24 when the scanner is coupled to the delay line 13 and the integrator 15 but there is no connection between these components and the output of the amplifier 18. Such omissions will degrade performance but a useful apparatus may nevertheless be constructed.

The threshold value may be automatically derived in other ways, for example more integrators and delay lines may be used, and delays near to but differing from one line duration may be employed to change the shape of the area 30.

The invention may be employed where the surface of a material is scanned to show areas of different reflectivities. The illumination of the surface and/or the path by which light reflected from the surface reaches a light sensitive device may be moved systematically in order to scan the surface.

It will be appreciated that the invention need not be put into practice in the way specifically described, for example the invention could be implemented digitally using digital components.

I claim:
1. Apparatus for detecting the presence of areas of a material having light transmission properties which differ from those of the remainder of the material, including:
   means for generating a light-intensity signal dependent on the intensity of light received from different portions of the material, including means for scanning an area of interest of the material in a series of lines,
   a number of delay means connected in series the first delay means being connected to receive the light intensity signal and each delay line imparting a delay equal to the time taken to scan one line,
   integrator means for forming a continuous threshold signal dependent on the sum of the integral for a predetermined preceding interval of the light-in- tensity signal as applied to the input to the first delay means and the integrals for the predetermined preceding interval of the output signals of the delay means, and comparator means for comparing the light-intensity signal with the threshold signal to provide signals indicating when the value of the light-intensity signal exceeds that of the threshold signal.

2. Apparatus for detecting the presence of areas of a material having light transmission properties which differ from those of the remainder of the material, including:

means for generating a light-intensity signal dependent on the intensity of light received from different portions of the material, the scanning means, in operation, including means for scanning the material in a series of lines, threshold-determining means for forming a threshold signal dependent on the light transmission properties of the material physically adjacent the portion from which light is received by the generating means at any time during operation, and comparator means for comparing the light intensity signal with the threshold signal and producing signals indicating the detection of said areas, the threshold-determining means comprising a plurality of delay means connected in series, with the first delay means connected to receive the light intensity signal, a number of integration means each providing, in operation, a continuous output signal dependent on the integral for a predetermined preceding interval of the input signal thereto, each integrator means except one having its input circuit coupled at the output of one delay means particular thereto, and the said one integrator means having its input circuit coupled to receive the light intensity signal, and means for summing the output signals from the integrator means in providing the threshold signal.

3. Apparatus according to claim 2 wherein the comparator means provides a binary output signal having one value when the threshold signal is exceeded by the light intensity signal and another value at other times, and logic means are provided for coupling the input circuit of the threshold-determining means to the output circuit thereof instead of the scanning means when the binary signal indicates that the threshold signal is exceeded.

4. Apparatus according to claim 2 wherein each integrator includes a shunt capacitor and series resistor.

5. Apparatus according to claim 2 wherein the scanning means is a flying spot scanner.

6. Apparatus according to claim 2 wherein the scanning means is such that the magnitude of its output signal depends on the opacity of the material.

7. Apparatus as in claim 2 wherein the scanning means is a television camera.

8. Apparatus as in claim 2 wherein the scanning means is such that the magnitude of its output depends on the reflectivity of a surface of the material.

* * * * *